(12) United States Patent
Barnes et al.

(10) Patent No.: US 11,905,044 B2
(45) Date of Patent: Feb. 20, 2024

(54) SOLAR SAIL FOR ORBITAL MANEUVERS

(71) Applicant: L'Garde, Inc., Tustin, CA (US)

(72) Inventors: Nathaniel C. Barnes, Irvine, CA (US); Darren D. Garber, Rancho Palos Verdes, CA (US)

(73) Assignee: L'Garde, Inc., Tustin, CA (US)

( * ) Notice: Subject to any disclaimer, the term of this patent is extended or adjusted under 35 U.S.C. 154(b) by 321 days.

(21) Appl. No.: 17/471,138

(22) Filed: Sep. 9, 2021

(65) Prior Publication Data

US 2022/0127021 A1 Apr. 28, 2022

Related U.S. Application Data

(63) Continuation of application No. 16/095,939, filed as application No. PCT/US2017/031436 on May 5, 2017, now Pat. No. 11,142,348.

(60) Provisional application No. 62/332,202, filed on May 5, 2016.

(51) Int. Cl.
*B64G 1/40* (2006.01)
*B64G 1/50* (2006.01)
*B64G 1/64* (2006.01)

(52) U.S. Cl.
CPC ............. *B64G 1/407* (2013.01); *B64G 1/40* (2013.01); *B64G 1/50* (2013.01); *B64G 1/64* (2013.01)

(58) Field of Classification Search
CPC . B64G 1/407; B64G 1/40; B64G 1/50; B64G 1/64; B64G 1/222
See application file for complete search history.

(56) References Cited

U.S. PATENT DOCUMENTS

| | | | |
|---|---|---|---|
| 4,262,867 A | 4/1981 | Piening | |
| 4,759,517 A | 7/1988 | Clark | |
| 5,979,833 A | 11/1999 | Eller | |
| 2003/0010869 A1 | 1/2003 | Kawaguchi | |
| 2003/0010870 A1 | 1/2003 | Chafer | |
| 2004/0085615 A1* | 5/2004 | Hill | G02B 26/0825 359/288 |
| 2004/0140402 A1 | 7/2004 | Wehner | |
| 2008/0228332 A1 | 9/2008 | Hindle | |
| 2011/0023484 A1 | 2/2011 | Lu | |
| 2013/0292518 A1 | 11/2013 | Lagadec | |
| 2018/0257795 A1 | 9/2018 | Ellinghaus | |

(Continued)

FOREIGN PATENT DOCUMENTS

CN 105480436 A * 4/2016
CN 110371324 A * 10/2019 ............... B64G 1/22

(Continued)

OTHER PUBLICATIONS

Costanza et al, "Design and characterization of a small-scale solar sail deployed by NiTi Shape Memory actuators", Jun. 2016, Science Direct, All pages (Year: 2016).*

*Primary Examiner* — Valentina Xavier
(74) *Attorney, Agent, or Firm* — Kari L. Barnes

(57) ABSTRACT

A solar sail includes a bus and a plurality of separate movable vanes coupled to the bus. Each movable vane includes a reflective surface for generating solar radiation pressure and propel the solar sail in space. Each vane may be movable relative to the bus in a fully deployed configuration such that an amount of thrust generated by solar radiation pressure on each vane is controllable.

20 Claims, 5 Drawing Sheets

(56) References Cited

U.S. PATENT DOCUMENTS

2019/0144141 A1\* 5/2019 Barnes .................. B64G 1/407
                                                    244/171.5
2020/0130872 A1    4/2020 Spencer
2022/0388694 A1\* 12/2022 Barnes .................. G02B 7/183

FOREIGN PATENT DOCUMENTS

| CN | 111806723 A | \* | 10/2020 | ............... B64G 1/22 |
| CN | 112389683 A | \* | 2/2021 | ............... B64G 1/44 |
| JP | 2016030486 A | | 3/2016 | |

\* cited by examiner

SOLAR SAIL FOR ORBITAL MANEUVERS

PRIORITY

This application claims priority as a continuation to U.S. application Ser. No. 16/095,939, now U.S. Pat. No. 11,142,348, filed Oct. 23, 2018, that claims priority as a national stage of International Application No. PCT/US2017/031436, filed May 5, 2017, that claims priority to U.S. Application No. 62/332,202, filed May 5, 2016, which are incorporated by reference in their entirety into this application.

BACKGROUND

Solar sails are a method of spacecraft propulsion that uses solar radiation pressure to propel a sail in space, much in the same way the wind propels sails on sailboats, where air molecules push on the sail fabric. Similarly, photons bombard a solar sail in space such that if the sail is coated with a reflective material, the photons are specularly reflected, resulting in a transfer of momentum double that of a normally incident incoming photon. The most obvious source of photons is our sun, but other sources of light, such as lasers, can also propel reflective sails.

Several solar sails have been designed in past years, and a few very basic sails have been launched into space. All of these sails have the same objectives: increase surface area of the sail material and reduce overall weight. Because the momentum of a photon is so small, sails must have very large areas to accelerate to usable velocities in space. Therefore, a driving factor in sail designs is to maximize the surface area of the reflective surface of the sail. Also, because payloads are limited in size and weight, and the cost of a launch is primarily based on the weight, sails must also be as light weight as possible. Therefore, conventional sails minimize weight by reducing the amount of control componentry on the sail. Given these design considerations, conventional sails are generally planar with a static sail configuration. The solar sail itself is simply a mechanism to provide thrust or propulsion. Given the static configuration and the massive inertial moments in such large sails, sails have not been used for navigation. Therefore, other navigational components are incorporated to position and direct the device. Back to the sailboat analogy, the sail provides the push forward, while the rudder provides the steering. Similar the solar sail provides the push forward, while another controller provides the steering.

SUMMARY

Exemplary embodiments described herein include a solar sail that has a bus and a plurality of separate movable vanes coupled to the bus. Each movable vane includes a reflective surface for generating solar radiation pressure to propel the solar sail in space. Each vane may be movable relative to the bus in a fully deployed configuration such that an amount of thrust generated by solar radiation pressure on each vane is controllable. Accordingly, by controlling the position of the vanes, the solar sail may be navigated directly through solar thrust.

DRAWINGS

DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Embodiments described herein include novel design(s) for a solar sail that include inventive steerable vanes for navigating and propelling a solar sail. The sail may include any combination of rigid and steerable vanes. The vanes may be movable to control a direction of thrust for navigation. In an exemplary embodiment, the vanes include one or two rotational degrees of freedom. When integrated with a small lightweight spacecraft, the stowable volume and mass can be minimized, while achieving a usable navigation system to support a secondary payload for planetary orbit or interplanetary applications.

Figure 1:
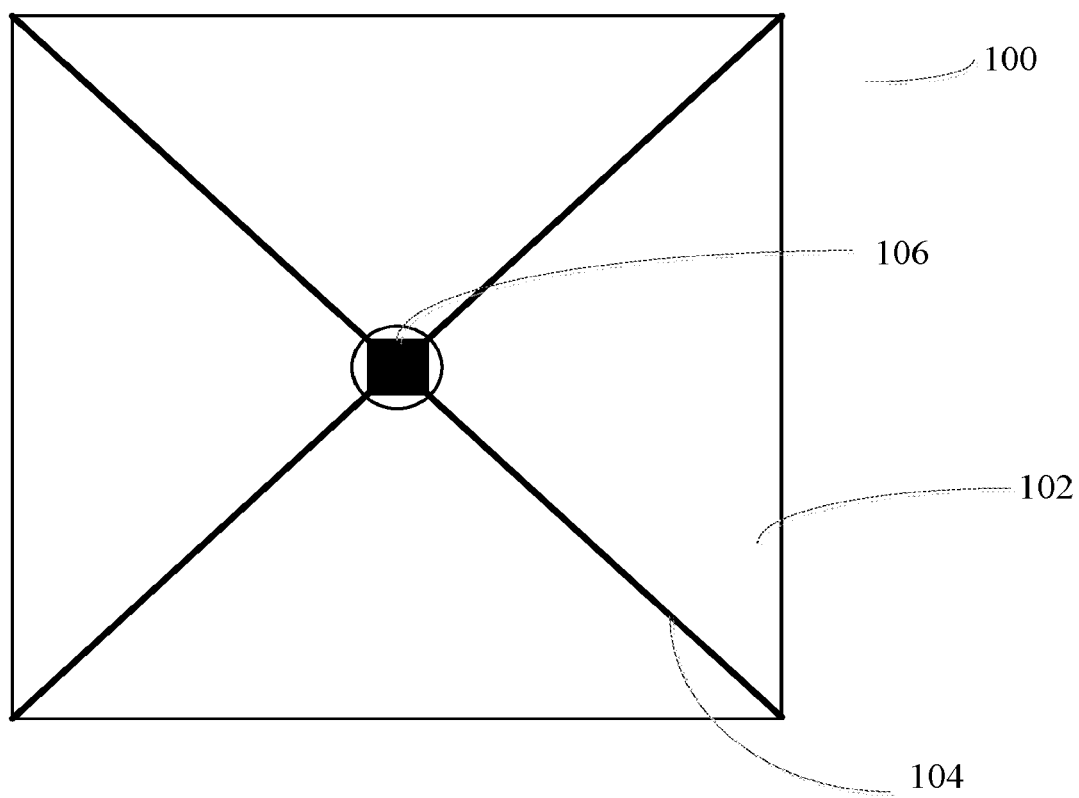
FIG. 1 illustrates a conventional solar sail.

FIG. 1 illustrates an exemplary conventional solar sail. The solar sail 100 includes a thin reflective surface 102 to reflect photons and generate propulsion. The sail includes a plurality of booms 104 to support the thing reflective surface 102. A standard spacecraft bus 106 is generally centrally positioned to the thin reflective surface 102. Conventional sail configurations use the same support frame for adjacent quadrants of the thin reflective surface to conserve weight and component space. Conventional sail configurations also use a static deployed shape to provide a propulsion surface. Because of the solar sail's immense size, the solar sail has a very large mass moment of inertia (being proportional to the square of the radius of the surface). Therefore, the solar sail itself has not been conventionally used to provide navigation. Instead of using the sail to navigate, the standard spacecraft bus 106 usually includes a propulsion system to provide slight directional changes intended to be realized over vast distances for long range navigation. Therefore, the solar sail is conventionally limited to provide propulsion only.

Figure 2:
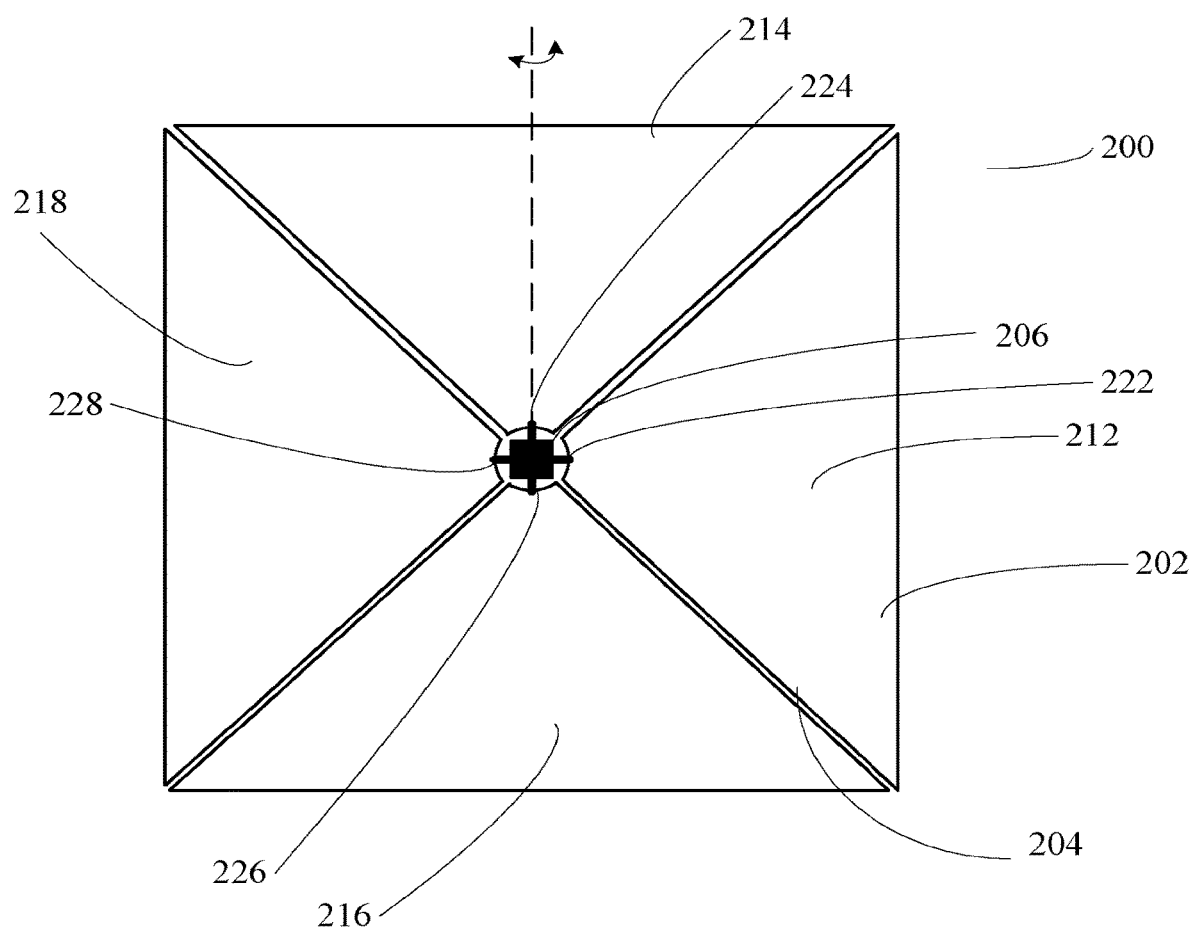
FIG. 2 illustrates a solar sail having a plurality of separate movable vanes coupled to a bus according to embodiments described herein.

FIG. 2 illustrates exemplary embodiments of a solar sail for orbital maneuvers according to embodiments described herein. As shown, the solar sail 202 is subdivided into separate individual sale vanes 212, 214, 216, 218. As shown, four vanes are illustrated, such that the single sail is divided into quadrants. However, any plurality of vanes or any fractionating of the solar sail may be used and is within the scope of the instant disclosure. Each vane 212, 214, 216, 218 is coupled to the spacecraft bus 206 by a support 222, 224, 226, 228, respectively. A support may be actuated to move the vane relative to the bus.

Actuation or movement of a vane relative the bus may be in any orientation, with 1 to 6 degrees of freedom. In an exemplary embodiment, the connection between the bus and the vane has one degree of freedom. The one degree of freedom may be rotational about an axis. The rotation may be about the connection axis between the bus and the vane, or about an axis of symmetry of the vane as illustrated by the dash line of FIG. 2. In an exemplary embodiment, the connection between the bus and the vane has two degrees of freedom. The two degrees of freedom may be rotational about orthogonal axis. As illustrated, the top vane 214 may rotate about a first axis and second orthogonal axis in the plane of the figure such that the vane may rotate about the dashed line where opposing corners of the vane simultaneously move in and out of the plane of the figure in opposing directions and about a second axis (not shown) where the same opposing corners oldie vane simultaneously in or out of the plane of the figure together. Additional or any combinations of translational or rotational motion may be used.

In an exemplary embodiment, all of the vanes defining the solar sail are moveable relative the hub. In this case, each of the vanes may be coupled to the hub through a support member, where the support member is actuated having at least one degree of freedom. Therefore, the plurality of vanes defining the solar sail are movable relative to the bus after the vanes are fully deployed. The vane shape may be rigid after deployment, while the orientation of the vane relative to the hub may be dynamic.

In an exemplary embodiment, only a subset of vanes defining a solar sail is moveable relative to the hub. In this case, at least one of the vanes is static relative to the hub, once the vane is fully deployed. The support member between the vane and the bus may therefore be rigid, rigidizable, or non-movable after deployment. At least one of the vanes is also movable relative to the hub once the vane is fully deployed. The vane shape may be rigid after deployment, while the orientation of the vane relative to the hub may be dynamic. In an exemplary embodiment, the subset of movable vanes occur in opposing pairs, while the subset of rigid vanes occur in opposing pairs. Therefore, movable vanes may occur on opposing sides of the solar sail from each other, while non-movable vanes may occur on opposing sides of the solar sail for each other. For example, vanes 214 and 216 may be movable, while vanes 212 and 218 may be non-movable, after full deployment of the solar sail. In an exemplary embodiment, the solar sail includes more sails that are movable than are not movable.

In an exemplary embodiment, vanes may be actuated in groups. In this case, a plurality or a subset of vanes may move simultaneously or a desired or similar predefined orientation. For example, a pair of vanes may move together such that their orientation is in unison to either unfurl or furl those portions of the sail together. Each of the vanes creating the entire solar sail may be within the same group, such that they move in unison. For the illustration shown, all four quadrants may move such that they are positioned generally planar or in a fully exposed orientation (unfurled), or may be rotated 90 degrees therefrom to a fully unexposed orientation (furled).

In an exemplary embodiment, vanes may be moved to predefined orientations within the range of motion of the actuator. For example, any vane may have two, three, four, or more predefined orientations. In the case of two predefined orientations, the vane may be fully exposed or fully unexposed as described herein. Therefore, the actuator may be turned on to move the vane from one orientation to another, and configured to automatically stop at the other orientation once reached. In the case of three or more predefined orientations, any combination of positions may be used, such as the fully exposed, fully unexposed, and one or more partially exposed orientations. In an exemplary embodiment, a first predefined orientation may be at zero degrees and represent the fully exposed configuration, a second predefined orientation may be rotated 20 degrees from the fully exposed configuration, a third predefined orientation may be rotated 45 degrees from the fully exposed configuration, a fourth predefined orientation may be rotated 70 degrees from the fully exposed configuration, and a fifth predefined orientation may be rotated 90 degrees from the fully exposed configuration to define a fully furled or unexposed configuration. Any combination of predefined orientations may be used, such as any interval of 1 degree, 2 degrees, 5 degrees, 10 degrees, 13 degrees, 20 degrees, 45 degrees, etc. between and including 0 degrees to 90 degrees or −180 degrees and 180 degrees. In an exemplary embodiment, one or more of the vanes may have full range of positions, such that the vane may be positioned at any continuous orientation from a first position to a second position. In an exemplary embodiment, the vane may fully rotate about an axis in one or more full revolutions. In an exemplary embodiment, the vane may only partially rotate about an axis such that the vane is configured to move only within or from a first position to a second position that does not define a full revolution. In an exemplary embodiment, the angular range from the first position to the second position is 90 degrees.

Figure 3C:
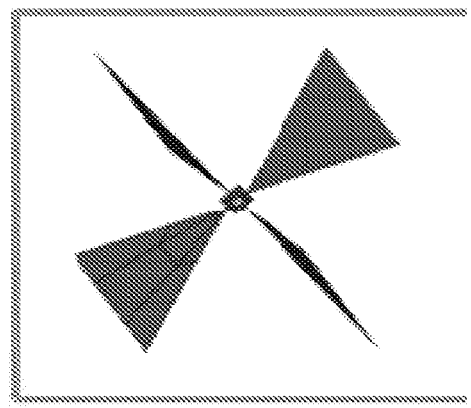
FIGS. 3A-3C illustrate controllable orientations of the separate movable vanes to effect navigation of the solar sail, according to embodiments described herein.
Figure 3B:
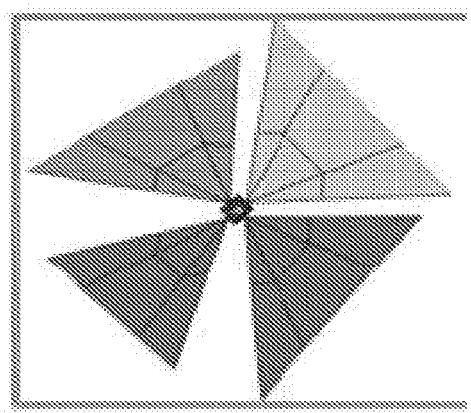
Figure 3A:
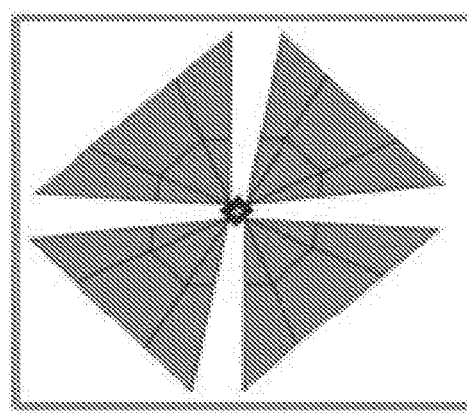

FIGS. 3A-3C illustrates exemplary vane orientations according to embodiments described herein. FIG. 3A illustrates an exemplary solar sail including four vanes in a full sail or fully exposed orientation in which each vane is considered in a zero degree orientation. FIG. 3B illustrates an exemplary orientation for windmilling in which each vane is rotated counter-clockwise about the bus to vane axis by 20 degrees. FIG. 3C illustrates an exemplary orientation in which the sail is fully furled and the vanes are considered in a ninety degree orientation from the fully exposed or full sail orientation.

In an exemplary embodiment, the bus may include power supply, processor, input/output devices, ports, communication, receiver, transmitter, or other circuitry or componentry, and any combination thereof. The bus may include a power supply for powering the solar sail. The power supply may include a battery and/or solar panels for providing power to the sail. The bus may include a camera, infrared sensor, light sensor, or other sensor. The bus may include a transmitter and/or receiver for remote communication. The bus may include memory for storing non-transient, machine readable code, that when executed by a processor that may also be on the bus, performs functions described herein including, without limitation, controlling the positioning of one or more vane. Other or additional functions may include determining a desired orientation of the vanes, determining a position of the solar sail, determining a position of the light source propelling the sail, sending/receiving data through the transmitter/receiver, and any combination thereof. The bus may also contain the necessary electronics to perform communication, inertial measurement and positioning, navigation, data storage, imaging, power supply (including but not limited to photovoltaic power), and vane actuation. For example, possible instrumentations may include, but are not limited to, any combination of communication antenna, miniature motor(s), magnetometer, laser altimeter, spectrometer, photovoltaic array, battery, Global Positioning System (GPS), camera, light sensor, infrared sensor, electronic processor, memory, etc.

As illustrated, each of the solar sail vanes are directly coupled from the vane to the bus such that another vane does not intervene therebetween. However, other fractionation of the solar sail into different vane configurations is within the scope of the instant disclosure. Therefore, one or more vanes may indirectly couple to the bus through another one or more vanes. In other words, the solar sail may be fractionated such that vanes may be coupled to an adjacent vane before connection to the bus. A support between adjacent vanes may be actuated or may be rigid after full deployment as described herein.

The reflective surface of the solar sail described herein or any individual vane may include a support frame and a reflective surface. The support frame may include a first stowed configuration and a second fully deployed configuration such that the sail may be stowed and transported for deployment in space. The support frame may transition from the first stowed configuration to the second fully deployed configuration by any means. For example, the support frame may be flexible such that it is deformed during storage. The support frame may have a remembered configuration such that, when stowed, an outside force constrains the frame in the first stowed configuration, but when the outside force is removed, the frame automatically transitions to the second fully deployed configuration. The frame may have a first position and a second remembered position that is triggered by predefined temperatures. The frame may be inflatable such that the fully deployed configuration is created when all or a portion of the frame is exposed to an internal pressure (i.e. inflated). The frame may be rigidizable such that a final deployed configuration is maintained after deployment. The frame may include one or more pivots or hinges to permit the frame to bend for positioning in the first position and unbend to transition to the second position. In an exemplary embodiment, the frame may comprise a flexible structure along its length to permit deformation for storage, but also have a remembered configuration such that when unconstrained returns to the second deployed configuration.

In an exemplary embodiment, the frame may include one or more struts to support the reflective surface. The frame may fully define a perimeter of a vane such that a strut is positioned on each terminal edge of a vane defining an outer support frame. As shown, separate and independent frames may be used to support separate and independent reflective surfaces to define individually movable vanes. Any combination, shape, orientation, or configuration of struts may be used to support the reflective surface. For example, as seen in FIG. 4C, interior struts may be used to provide support for the reflective surface. In an exemplary embodiment, the entire reflective surface may be supported by a frame material. In an exemplary embodiment, only portions of the reflective surface may be supported by a frame material. As shown in FIG. 4C, one or more interior struts project from a position adjacent the bus to an exterior edge of the vane away from the bus. As shown in FIG. 4C, one or more interior struts project across the vane. Internal struts may be positioned to meet such that one internal vane may be positioned between two other internal struts or between an internal strut and an external, perimeter strut.

In an exemplary embodiment, the support structure may include an outer frame and/or ribs, and/or struts. The support structure, including any combination of outer frame, ribs, and struts, may comprise a shape memory composite material. The shape memory composite material permits a vane to collapse under the application of an outside force in a non-structured fashion. The collapsed configuration may therefore be dynamically determined based on the storage compartment or the outside force applied. For example, the shape memory composite may be flexible or deformable along a length when a force is applied. The shape memory composite, however, returns to a remembered configuration, once the force is removed. Therefore, exemplary embodiments may include a stowed configuration in which the support structure is retained in the stowed configuration having a reduced storage volume through application of an outside force: and a deployed configuration in which the support structure is fully deployed having a larger storage volume or area when the outside force is removed. In other words, the remembered or biased configuration may be a deployed configuration in which the support structure is configured for use as a solar sail as described herein. In an exemplary embodiment, the shape memory composite may flex in any direction under application of an outside force. In an exemplary embodiment, the shape memory composite may flex at multiple locations along a length of the member or along an entire length of the member. In an exemplary embodiment, the shape memory composite may return to a remembered configuration, such as linear, triangular, polygonal, rectangular, square, diamond, quadrilateral, circular, ovoid, curved, parabolic, or other predefined shape or combination thereof when the outside force is removed.

An exemplary shape memory composite material includes a base material of one or more of carbon fabric or tows, Vectran, or Kevlar. The base material may define a plurality of individual strands. The strands may be generally aligned along a length of the strut, may include one or more aligned arrangements, may be wound or helically positioned, may be woven, or any combination thereof. The shape memory composite material may includes a matrix around and/or between the base material. The matrix may be silicone, urethane, or epoxy. Exemplary shape memory composite materials are described in co-owned patent application U.S. Patent Publication Number 2016/0288453, titled "Composite Material". Exemplary embodiments of a support structure include a foldable shape memory carbon composite material.

In an exemplary embodiment, the reflective surface may include a flexible membrane having a reflective surface. The surface may be created by coating, laminating, depositing, or otherwise attaching a material to the membrane surface or from the membrane surface itself. In an exemplary embodiment, the membrane comprises molar, kapton, polyurethane-coated nylon (PCN), tedlar, Teflon, other polyimide or plastic materials, and combinations thereof. The reflective coating may include a layer of high conductivity metal, such as aluminum, silver, silver-inconel, and combinations thereof. The membrane may also be made of a conductive material such as foils of aluminum or stainless steel as well as carbon fabric or a conductive mesh. The membrane may also consist of a laminate of a combination of some or all of the materials described herein. The surface may be coated with a layer of high conductivity metal such as aluminum or silver or silver-inconel. The thickness of the metallization can be between 100 to 2,000 Angstroms. An exemplary embodiment of a reflective surface includes gores of a low-coefficient of thermal expansion polyimide membrane coated with 1,500 angstroms of Silver-Inconel.

In an exemplary embodiment, the reflector may include a monolithic surface made of a shape memory composite material laminated with a layer or layers of metallized membrane such as mylar, kapton, polyurethane-coated nylon (PCN), tedlar, Teflon or other polyimide or plastic material. The shape memory composite may be coated with a layer of high conductivity metal such as aluminum or silver or silver-inconel, as described herein. The reflective coating may be applied or positioned directly on the shape memory composite material or on a membrane overlaying the shape memory composite material. In an exemplary embodiment, the monolithic surface of shape memory composite material may replace the struts and/or outer frame of the support structure. Essentially, the monolithic shape memory composite material becomes a self-supporting structure.

In some cases, it may be preferable to have the support structures made of hollow tubes, instead of foldable rods. Their deployment may be initiated by the use of an onboard pump and an inflatant gas such as nitrogen, carbon dioxide, or other inert substances like helium or argon. Other gases may also be used, depending on the mission concept.

In an exemplary embodiment, the shape memory material may be used for all or only portions of the support structure. For example, the reflector outer frame may comprise shape memory material, while the ribs comprise conventional rigid segmented materials. Other combinations of shape memory structures with conventional structures are also contemplated hereby. Therefore, any combination of shape memory composite materials, inflatable materials, rigidizable materials, or rigid materials across any combination of components are contemplated hereby.

Figure 4A:
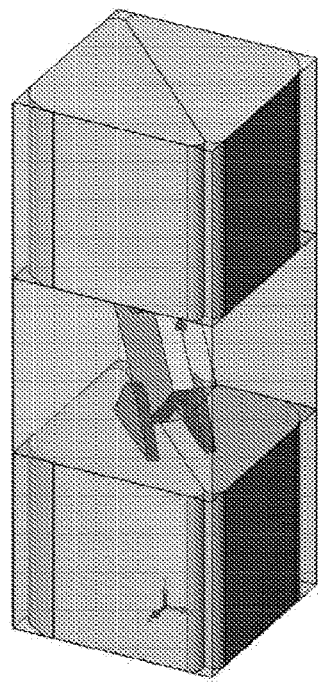
FIGS. 4A-4C illustrate a stowed, a transition, and a fully deployed configuration of the solar sail according to embodiments described herein.
Figure 4B:
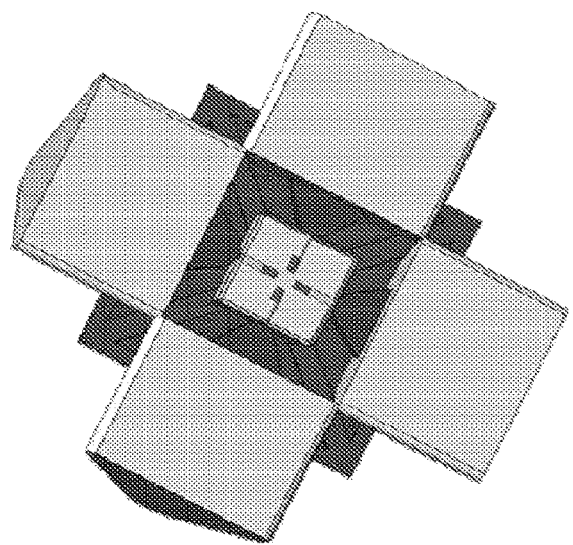
Figure 4C:
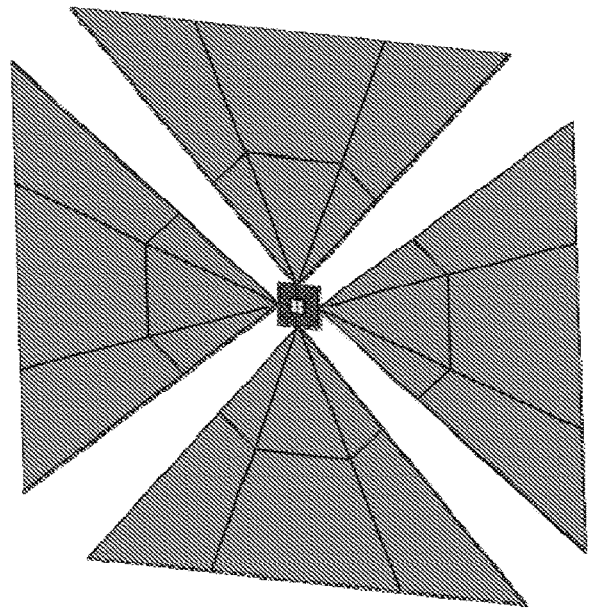
Figure 5:
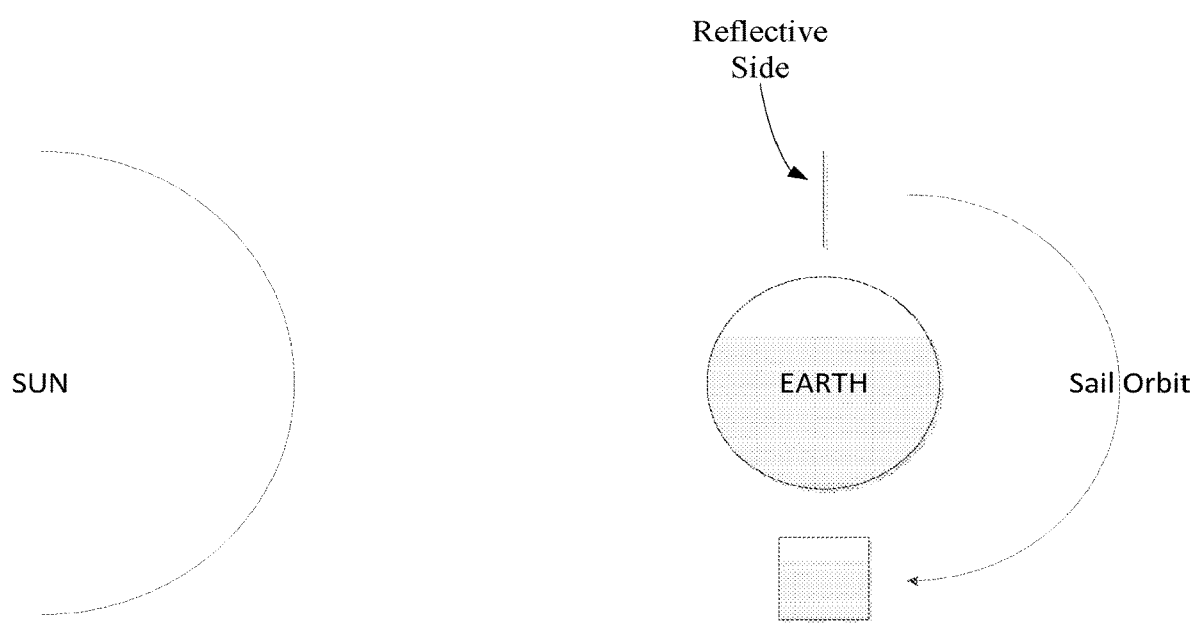
FIG. 5 illustrates an exemplary method of using an exemplary solar sail according to embodiments described herein.

FIGS. 4A-4C illustrate an exemplary transition of a solar sail from a stowed configuration, through a transition configuration, to a fully deployed configuration. Because of the separation of individual vanes creating the solar sail, unique and novel stowed configurations may be achieved.

An exemplary stowed configuration is illustrated in FIG. 4A. As shown, individual vanes defining a single solar sail may be stowed on opposing sides of the system bus. This configuration is unique from conventional systems that included a monolithic solar sail that had to be stowed on one side of the bus to prevent damage and proper storage for deployment of the sail. As seen in FIG. 4A, two vanes may be stowed together on each of opposing sides of the bus to define first and second stowed volumes for the vanes. Triangular cylindrical storage volumes are illustrated for respective vanes, but any storage configuration is contemplated herein. Also as seen in FIG. 4A, positioning the bus in the between vanes permits the direct attachment of the vane to be maintained and minimal support and actuation features to be used between the bus and vane.

An exemplary transition configuration is illustrated in FIG. 4B. Once deployment is initiated, the individual vanes may reorient such that the vanes are positioned around the bus. The vanes are in a position ready to deploy. The illustration of FIGS. 4A-4C are exemplary only, and not intended to be limiting. For example, the vanes may not stay in a collapsed configuration to orient relative to the hub before the vanes deploy.

An exemplary final configuration or fully deployed configuration is illustrated in FIG. 4C. Since one or more of the separate vanes are movable after deployment, FIG. 4C illustrates only one possible configuration of the fully deployed configuration. Once in a fully deployed configuration, the vane shape may be static or dynamic. In an exemplary embodiment, in the fully deployed configuration, regardless or orientation of the vanes, each vane is fully deployed to define a maximum surface area. Therefore, the fully deployed shape of the vane is static after deployment. Therefore, the fully deployed configuration maintains the vane shape regardless of the orientation of the vane relative to the bus. Exemplary embodiments may also include modification of the vane shape after deployment.

Embodiments described herein include novel design(s) for a solar sail that is comprised inventive steerable vanes for navigating a solar sail in earth orbit or in interplanetary space. In one embodiment, the solar sail consists entirely of steerable vanes. When integrated with a small lightweight spacecraft with miniature electronics, the total area of the sail can be limited to a reasonable size, stowed in a small volume and launched as a compact secondary payload.

One exemplary embodiment, the vane solar sail includes a spacecraft bus and multiple reflective surface areas (vanes). The surface areas are articulated (1 or 2 degrees of freedom (DOF)) and allow for control of the reaction thrust of the solar radiation pressure.

The vanes may have a large surface area and a very low mass. They may include a lightweight membrane with a reflective surface and low mass structure to deploy and support the membrane in its final desired configuration. There is no limitation to the final shape of the vane (circular, triangular, polygon, or other geometric or freeform configuration, and combinations thereof). The reflective surface of the membrane can be applied or inherent to the membrane and serves the purpose of reflecting light to boost the overall thrust of the solar radiation pressure. Traditional membranes have been built of Kapton or Mylar but exotic carbon-carbon materials are also considered. The structure of the vanes is open to design trades and can be shape memory material, tape spring based, inflatable rigidizable, mechanical truss-based, and combinations thereof. Reflective coating on the sail could be any metallic thin layer, such as gold, silver, aluminum, etc.

In an exemplary embodiment, the vanes have the ability to articulate and thereby turn off or modulate the amount, location, and vector of thrust being applied to the spacecraft bus. In a simple implementation, the vane is attached to the spacecraft bus through a 1 DOF actuator that allows the vane surface to be positioned normal to or parallel with the Sun's light (rotate). A more sophisticated implementation would use 2 DOF actuators to not only rotate, but also to tilt in and out of the plane that the vanes were originally deployed in.

The vane sail provides thrust to a payload, similar to any spacecraft using conventional chemical or electrical propulsion. Chemical propulsion systems typically project large amounts of thrust but at low specific impulse (ISP), the measure of the efficiency of the propulsion system (change in momentum per unit propellant consumed). Electric propulsion systems, conversely, have less thrust but larger specific impulse. Solar sails, however, produce tiny thrust at effectively infinite specific impulse, since no fuel is consumed. The price paid due to tiny thrust is that accelerations are very low unless the total mass is tiny. Thus, to accomplish meaningful missions, the payload mass must be kept to a minimum. The smaller the area of the sail, the smaller the mass can be, with a range of area-to-mass ratios on the order of 10 to 20 to be mission effective.

Nominal payloads for large area sails (~1200 in$^2$) can be typically tens of kilograms. In an exemplary embodiment, the area of an articulated vane sail is much smaller, and therefore, the payloads are limited to hundreds of grams. In an exemplary embodiment, small size, weight and power such as found in miniature electronics and sensors are used as components for the solar sail. In one vane sail implementation, the payload has a weight and form factor similar to that of a smart phone. It could contain the necessary electronics to perform communication, inertial measurement and positioning, navigation, photovoltaic power, data storage, and imaging, in addition to a battery, communication antenna and miniature motors to rotate the vanes. Other possible instrumentations are also included, such as a magnetometer, laser altimeter, spectrometer, etc.

Exemplary embodiments described herein may be used to provide precise navigation of the solar sail and its payload. Conventional solar sails use imprecise navigation to generally orient the sail in a desired trajectory over vast distances to be realized over long periods of time. These systems are suited for interplanetary travel such that the navigation precision is on a very large scale. Embodiments described herein may be used for precise navigation that permit planetary orbital maneuvering.

Exemplary embodiments of the vane-sail is not limited to Earth orbit and is capable of being used in any solar/laser sailing application. In operations outside of Earth orbit, the sail would provide numerous benefits to navigation and control that are not possible with current solar sail designs.

A specific exemplary design of a current point design indicates that the vane sail will be able to achieve the following with a 12:1 Area (meters) to Mass (kg) ratio:
  in Low Earth Orbit (LEO)—Assuming a non-sunsynchronous orbit (worst case due to eclipse times) above 600 km altitude (atmospheric drag) it can change its altitude by 2 km per day.
  In Mid Earth Orbit (MEO)—A vane sail equipped spacecraft can change altitude by 25 km a day and 1 deg of inclination in a little of 1 week.
  At Geostationary Earth Orbit (GEO) Altitudes—A vane sail equipped spacecraft can change altitude by 50 km a day and inclination change of >1 deg/week 5 deg in a month additionally it can also provide 4-8 m/s per day of proximity operations.

As described herein, solar sails provide thrust to their spacecraft through radiation pressure from the Sun's light. That thrust is always "on" if the sail is being illuminated by the Sun. For exo-planetary exploration this is suitable. However, for operations of a solar sail in Earth orbit this is not desirable. As the spacecraft orbits the Earth, it is necessary to modulate and control the thrust of the spacecraft in order to effectively use it to change orbit parameters. A traditional sail with or without controls is not able to make the necessary rotation every orbit to keep the reflective surface directed at the sun. For example, as illustrated in FIG. 4C, a conventional sale, even using a propulsion or navigation means, cannot reorient the sale in the half orbit around the Earth. Therefore, if the reflective side is toward the earth on a first side of the Earth, such that it is being pushed in the direction of motion (i.e. the illustrated sail on the top side of the Earth), it cannot reorient when in the position at the illustrated bottom side of the Earth. Therefore, when it gets to the opposing side of the Earth, the reflective surface will actually be used to generate a thrust in the opposite direction to the sail motion, thus slowing it down.

Exemplary embodiments described herein may be used such that the solar sail simply rotates the vanes required with respect to the spacecraft and as a result can keep the vanes in the sun's light (or not) as required in order to create thrust at the appropriate portions of the orbit to cause orbital parameter changes. Therefore, as shown by the rest of FIG. 4C, the vanes may reorient when on the opposing side of the planet to turn off the sail and not interfere with the propulsion gained on the first side of the planet. As illustrated, the sail illustrated on the top side of the planet labelled Earth is perpendicular to the plane of the figure such that the entire sail receives the sun's light, and the sail is pushed in the direction of motion. On the opposing, or bottom side of the planet labelled Earth, the vane is rotated 90 degrees, such that an edgewise orientation is to the sun's light, and the reflective surface is perpendicular to the light. The sail is thereby turned off and no propulsion is imparted to the system. Any combination of vane orientations along the orbit may be used to control the position of the sail within the planetary orbit. For example, the vane may be turned on with each pass around the planet, such that it is used to increase speed along a portion of the orbit, and turned off the remaining orbit to increase speed and define a spiral orbit around the planet. Any combinations of vanes may be turned on or off to create the necessary propulsion to maintain any desired orbit, such that the orbital altitude may be increased, decreased or maintained, as desired.

Method of using exemplary embodiments described herein for navigation in Earth orbit. Exemplary embodiments may selectively navigate the solar sail within a single orbit. In this case, the vanes may be positioned to provide thrust in a desired direction to navigate the sail within a single orbital sphere, and/or to transition between orbital spheres.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. Specifically, exemplary components are described herein. Any combination of these components may be used in any combination. For example, any component, feature, step or part may be integrated, separated, sub-divided, removed, duplicated, added, or used in any combination and remain within the scope of the present disclosure. Embodiments are exemplary only, and provide an illustrative combination of features, but are not limited thereto.

As used herein, the terms "about," "substantially," or "approximately" for any numerical values, ranges, shapes, distances, relative relationships, etc. indicate a suitable dimensional tolerance that allows the part or collection of components to function for its intended purpose as described herein. The term "comprising" is synonymous with "including" and does not mean "consisting only of". Any reference to any reference or conventional system or knowledge in the description hereof should not be taken as an indication that it such disclosure defines prior art forms or forms any part of the common general knowledge.

The invention claimed is:

1. A solar sail, comprising:
   a bus; and
   a plurality of separate vanes movably coupled to the bus, each of the plurality of separate vanes defining and comprising a reflective surface for using solar radiation pressure to propel the solar sail in space,
   wherein each of the plurality of separate vanes comprises a support frame comprising a shape memory composite that permits dynamic deformation in a non-structured fashion for configuring the solar sail in the stowed configuration.

2. The solar sail of claim 1, wherein the plurality of separate vanes in the use configuration are contained in approximately the same plane.

3. The solar sail of claim 1, further comprising an actuator for each of the plurality of separate vanes having one rotational degree of freedom.

4. The solar sail of claim 3, wherein the one rotational degree of freedom is rotational through an axis of rotation through a center of symmetry of the vane and traverses the bus and the vane.

5. The solar sail of claim 3, further comprising a control system in which at least two of the plurality of separate vanes are controlled simultaneously and move the same rotational displacement for any actuation.

6. The solar sail of claim 1, further comprising one or more actuators for each of the plurality of separate vanes to define two degrees rotational of freedom between each of the plurality of separate vanes and the bus.

7. The solar sail of claim 6, wherein the two degrees of rotational freedom are about a first rotational axis through the bus and a center of symmetry of a vane and a second rotational axis orthogonal to the first rotational axis.

8. The solar sail of claim 1, wherein the support frame comprises a remembered configuration and the support frame is flexible such that it is deformed by application of an outside force in the stowed configuration, and removal of the outside force automatically transitions the support frame to the remembered configuration.

9. The solar sail of claim 1, wherein the solar sail has a stored configuration and a deployed configuration, the stored configuration comprises the plurality of separate vanes stowed on opposing sides of the bus.

10. The solar sail of claim 9, wherein the plurality of separate vanes includes four vanes, and the stored configuration comprises two vanes stowed together on each of the opposing sides of the bus defining first and second stowed volumes for the plurality of separate vanes.

11. A solar sail, comprising:
a bus; and
a plurality of separate vanes, each of the plurality of separate vanes movably coupled to the bus by a support frame of the vane, and each of the plurality of separate vanes defining a reflective surface for using solar radiation pressure to propel the solar sail in space,
wherein the support frame of each of the plurality of separate vanes includes a stowed configuration and a deployed configuration, and
wherein each connection between the bus and a vane of the plurality of separate vanes has a first rotational degree of freedom about an axis of symmetry of the vane and a second rotational degree of freedom orthogonal to the first rotational degree of freedom in a fully deployed configuration.

12. The solar sail of claim 11, wherein the plurality of separate vanes, in the fully deployed configuration, includes a first position and a second position rotationally orthogonal to the first position.

13. The solar sail of claim 11, further comprising an actuator for each of the plurality of separate vanes having one rotational degree of freedom.

14. The solar sail of claim 13, further comprising a control system in which at least two of the plurality of separate vanes are controlled simultaneously and move the same rotational displacement for any actuation.

15. The solar sail of claim 11, further comprising one or more actuators for each of the plurality of separate vanes to define two rotational degrees of freedom between each of the plurality of separate vanes and the bus.

16. The solar sail of claim 11, wherein the support frame of each of the plurality of separate vanes includes one or more struts to support the reflective surface, and wherein the support frame defines a perimeter of a vane of the plurality of separate vanes such that a strut is positioned on each terminal edge of the vane, defining an outer support frame.

17. The solar sail of claim 11, wherein each of the plurality of separate vanes are steerable vanes.

18. The solar sail of claim 11, wherein each of the plurality of separate vanes are directly coupled to the bus so that another vane does not intervene between the vane and the bus.

19. The solar sail of claim 11, wherein the plurality of separate vanes comprises four vanes with two vanes stowed together on each of opposing sides of the bus to define first and second stowed volumes for the plurality of vanes.

20. The solar sail of claim 11, wherein the support frame has a remembered configuration such that application of an outside force constrains the support frame in the stowed configuration, and when the outside force is removed the support frame automatically transitions to the fully deployed configuration.

* * * * *